No. 772,723. Patented October 18, 1904.

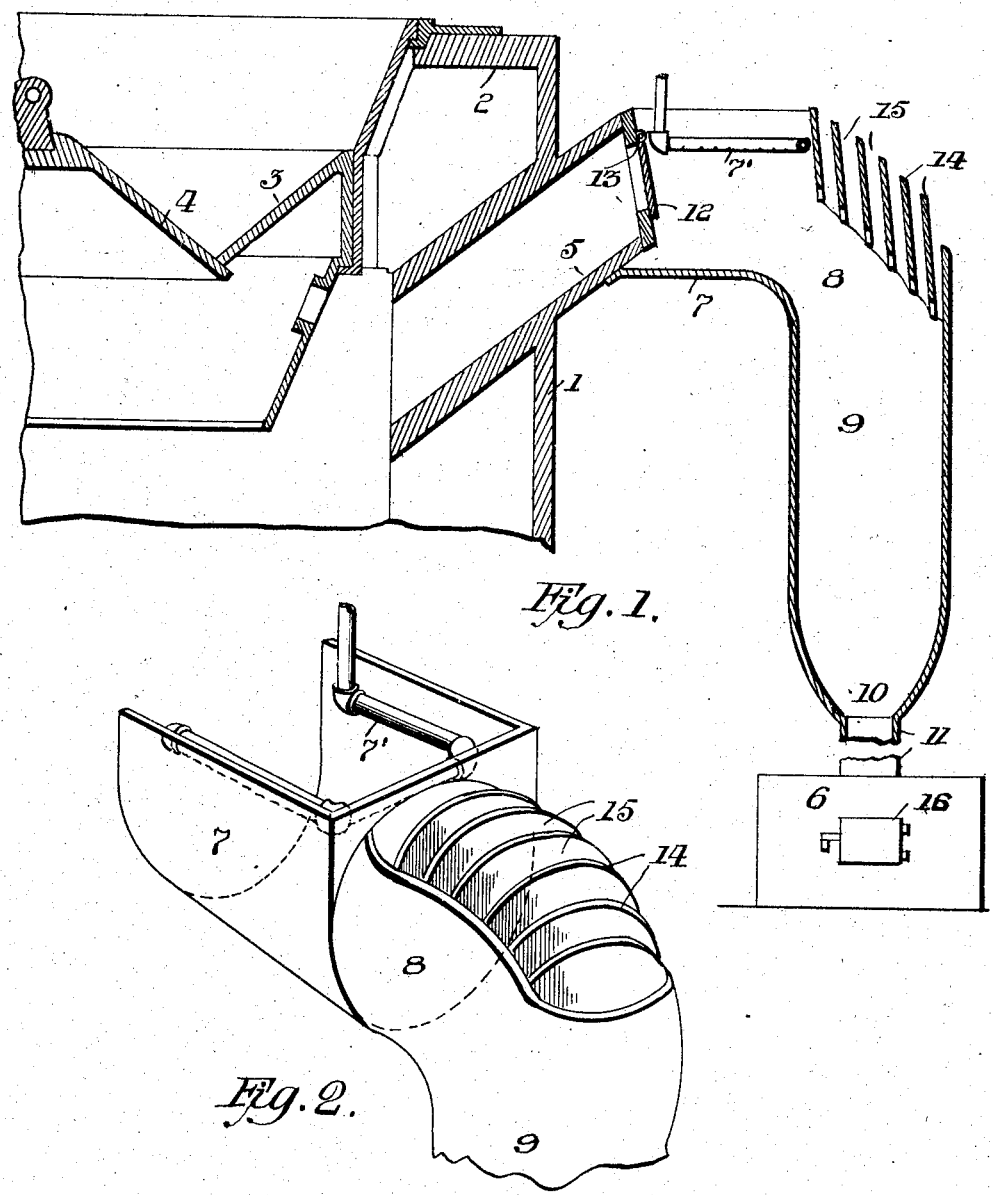

UNITED STATES PATENT OFFICE.

ANDREW LATTO AND JAMES C. CALLAN, OF BRADDOCK, PENNSYLVANIA.

BLAST-FURNACE.

SPECIFICATION forming part of Letters Patent No. 772,723, dated October 18, 1904.

Application filed April 9, 1904. Serial No. 202,377. (No model.)

*To all whom it may concern:*

Be it known that we, ANDREW LATTO, a subject of the King of Great Britain, and JAMES C. CALLAN, a citizen of the United States of America, both residing at Braddock, in the county of Allegheny and State of Pennsylvania, have invented certain new and useful Improvements in Blast-Furnaces, of which the following is a specification, reference being had therein to the accompanying drawings.

This invention has relation to blast-furnaces, and has for its object the provision of means for catching and collecting the dust, dirt, and fragments of ore which are discharged from the top of the furnace by the explosions which are incident to the operation of furnaces of this character.

In carrying our invention into effect we provide a furnace with a down-comer or dust-conduit, within which we arrange an explosion-door and a screen composed of tangentially-disposed plates, said conduit or down-comer being connected to a suitable dust-receptacle and the spaces between the plates of the screen communicating with the outer air, so that the smoke and gases from the furnace may escape, while the dust, dirt, and fragments of ore which pass through the conduit will be prevented from passing into the open air and will be directed into the dust-receptacle, and we further provide a water-spraying appliance located adjacent to the said plates, by means of which we spray water in the path of the dust and drive the dust into the receptacle.

In the accompanying drawings, Figure 1 is a vertical sectional view of part of the upper portion of a blast-furnace with our improvements applied thereto, and Fig. 2 is a perspective view of our improved down-comer or dust-collector.

1 designates the outer wall of the furnace, and 2 the top thereof. The furnace is provided with the usual hopper 3 and a spreader 4 and in these respects is of the ordinary and well-known form. An inclined conduit 5 is arranged with the top 2 and projects through the outer wall of the furnace, and our dust-collecting device is secured to the upper end of the conduit 5, being preferably composed of sheet metal and communicating with a dust-receptacle 6 of any desired form.

The dust-collecting device is composed of the angularly-disposed sections 7, the curved elbow 8, and the vertical portion 9, the latter having its lower end diminished in diameter, as at 10, and connected to a pipe 11, leading to the dust-receptacle 6. An explosion-door 12 is hinged at 13 at the end of conduit 5, and within the elbow 8 are arranged a series of tangentially-disposed plates 14, the arrangement of the plates being such that outwardly-extending openings 15 are left between the plates for the passage of smoke and products of combustion from the furnace. Within the part 7 and in front of the first plate is arranged a perforated pipe 7', receiving water from any suitable source, such pipe being designed to supply jets of water, which meeting the dust coming through the door 12 will wet down the dust and prevent it from passing out between the plates.

The parts being constructed and arranged in the above-described manner operate as follows: When an explosion takes place in the furnace or when from any cause dust or fragments of ore or other material are driven to the top of the furnace, they escape through the conduit 5 and passing through the section 7 of the dust-collector are met and wetted down by the spray from pipe 7'. The smoke and gases escape to the open air through the spaces 15 15, while the heavier products impinge against the plates 14 14, and by reason of the arrangement of these plates they glance off the plates and fall through the vertical portion 9 into the pipe 11 and thence into the dust-receptacle 6, from which they are removed from time to time, as occasion requires, through the door 16.

Having described our invention, we claim—

1. The combination with a blast-furnace, of a conduit communicating with the blast-furnace near the top thereof, and a dust-collector composed of a curved elbow, a downwardly-extending tube, angularly-disposed plates arranged in said elbow and having spaces between the plates communicating with the open air.

2. The combination with a blast-furnace, of a conduit communicating with the interior thereof, a dust-collector connected to said conduit and leading to a dust-receptacle, and angularly-disposed plates arranged in said dust-collector, said plates being spaced apart so as to leave spaces therebetween, which communicate with the open air.

3. In a furnace, the combination of a conduit communicating with the interior of the furnace, an explosion-door arranged at the end of said conduit, a dust-collector having a curved elbow, and a downwardly-extending portion, a dust-receptacle communicating with said downwardly-extending portion, and plates arranged in said elbow at an angle to the elbow and on the outer side of the elbow, said plates having downwardly-extending openings between them which communicate with the open air.

4. The combination with a blast-furnace, of a conduit communicating with the interior of the furnace, a dust-collector connected to said conduit, a series of plates arranged in said dust-collector and spaced apart so as to leave spaces therebetween communicating with the open air and means for spraying water within the dust-collector.

In testimony whereof we affix our signatures in the presence of two witnesses.

ANDREW LATTO.
JAMES C. CALLAN.

Witnesses:
H. C. Evert,
E. E. Potter.